Figure 8:
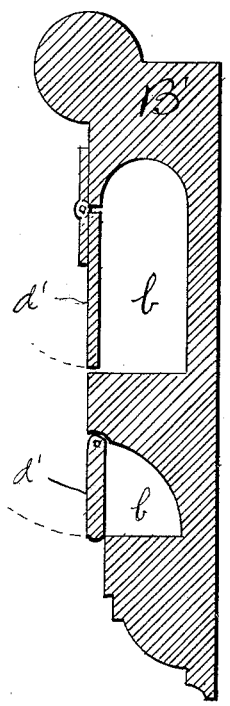

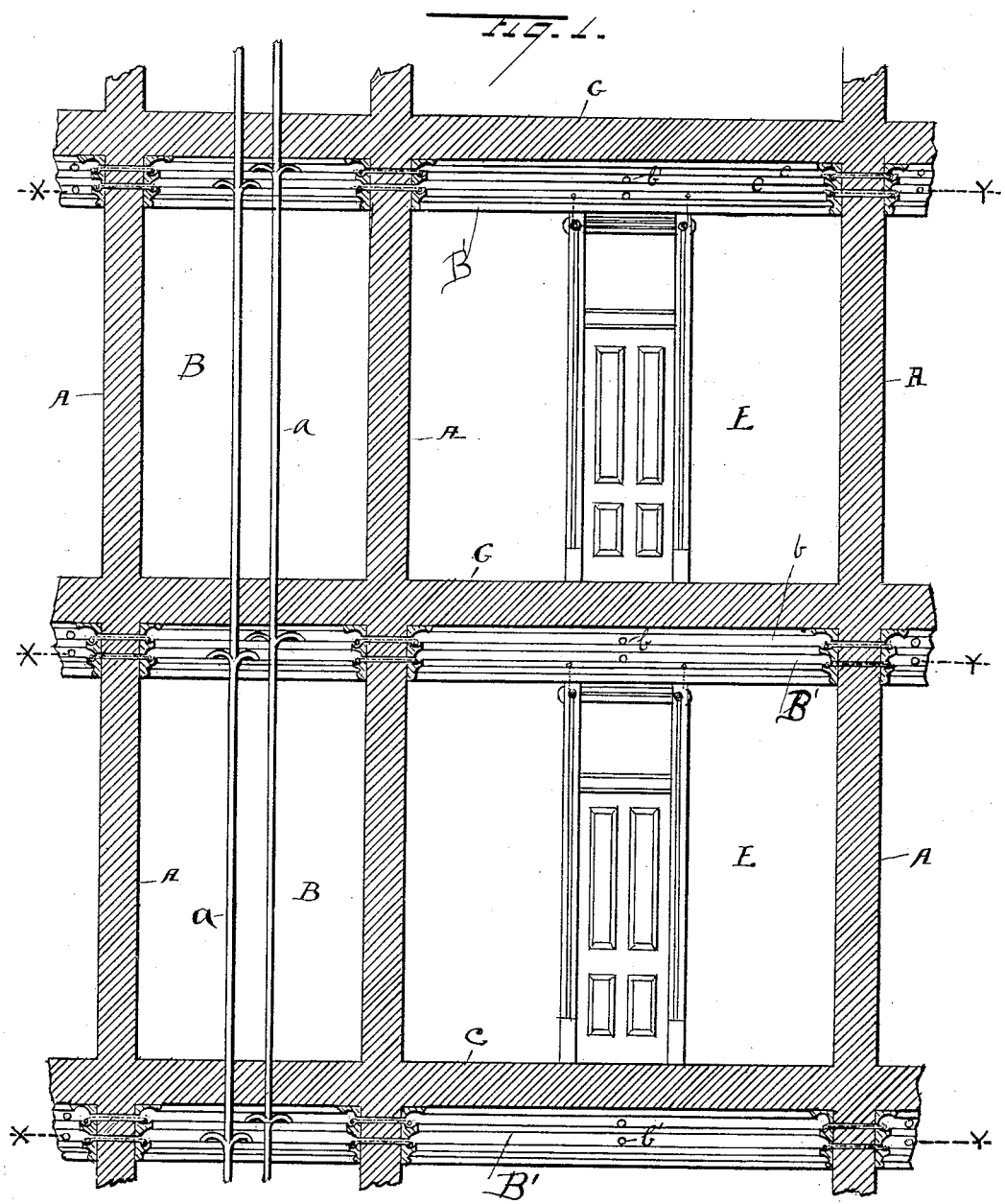

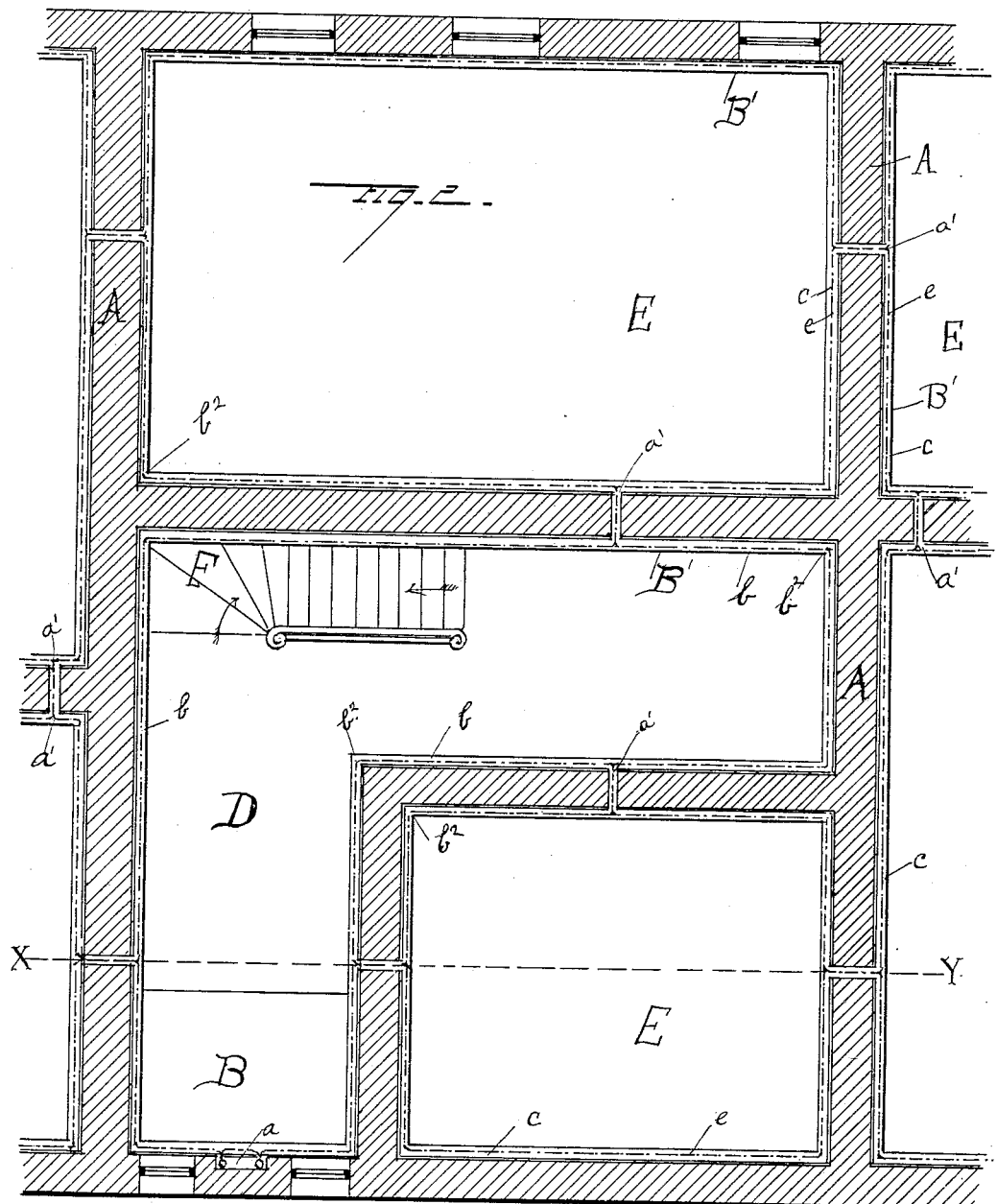

(No Model.) 4 Sheets—Sheet 3.
C. N. FAY.
BUILDING AND SYSTEM FOR LAYING ELECTRIC CONDUCTORS THEREIN.
No. 334,763. Patented Jan. 26, 1886.
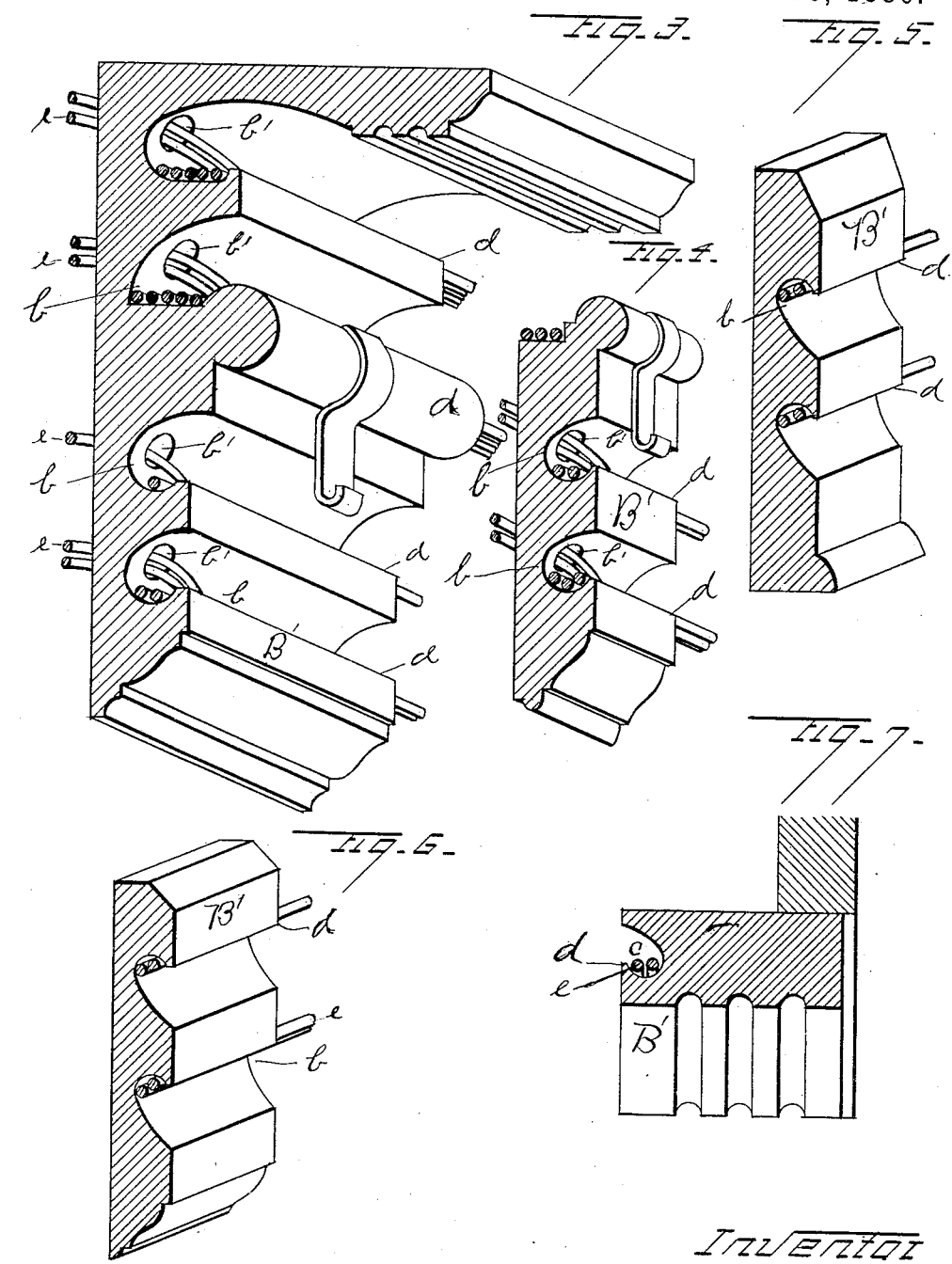

(No Model.) 4 Sheets—Sheet 4.
C. N. FAY.
BUILDING AND SYSTEM FOR LAYING ELECTRIC CONDUCTORS THEREIN.
No. 334,763. Patented Jan. 26, 1886.

Witnesses
Edmund Adcock
H. W. Munday

Inventor
Charles Norman Fay

UNITED STATES PATENT OFFICE.

CHARLES NORMAN FAY, OF CHICAGO, ILLINOIS.

BUILDING AND SYSTEM FOR LAYING ELECTRIC CONDUCTORS THEREIN.

SPECIFICATION forming part of Letters Patent No. 334,763, dated January 26, 1886.

Application filed January 20, 1885. Serial No. 153,375. (No model.)

*To all whom it may concern:*

Be it known that I, CHARLES NORMAN FAY, a citizen of the United States, residing in Chicago, in the county of Cook and State of Illinois, have invented a new and useful Improvement in Buildings and Systems for Laying Electric and other Conductors Therein, of which the following is a specification.

Heretofore great trouble and inconvenience have been experienced in laying and introducing electric and other conductors into buildings; also, in afterward making changes in the arrangement of the conductors and the necessary examinations to locate breaks, &c. It is generally desirable to conceal such conductors, and this has usually been accomplished by laying the same in the walls and floors of buildings. This method is expensive and inconvenient, first, because it is difficult accurately to foresee the requirements of the future as to particular portions of the building; and, secondly, because additions, alterations, and repairs cannot be made without tearing up floors and cutting and defacing walls, to the manifest injury of the building and annoyance of the occupants. Tubes have sometimes been laid in or upon floors and walls for the reception of such conductors, which are afterward drawn or threaded through the same; but this method is undesirable and inconvenient, because it precludes the examination of the conductors, drawn thereinto throughout their length, without first drawing them out again, and in case the draw-string breaks the tube is useless; nor can they be drawn through tubes that turn corners.

The object of my invention is to provide means whereby an indefinite number of conductors (whether of electricity, air, steam, water, gas, sound, or power) may be introduced into buildings cheaply and conveniently, or taken therefrom at any time, without cutting, defacing, or tearing up the building, and also to provide means whereby such conductors may at the same time be concealed from view; and to this end my invention consists in providing the walls of buildings with one or more connected and continuous systems of grooved recesses or furrows extending up and down from floor to floor, branching on each floor to the different rooms, the grooves or recesses upon different walls in the same room or hall being connected at the angles by abutting directly upon each other, and those upon opposite sides of the same wall, pilaster, screen, or column by apertures piercing the same.

The invention also consists in making the form and depth of the furrows or grooves and the lips or projecting members thereof such as will conceal from view the conductors laid therein, the whole forming a continuous conduit or continuous conduits, into which conductors may be laid or from which they may be removed laterally at any time without drawing or threading in and without cutting, disturbing, or defacing the walls or anything affixed thereto. These grooved recesses or conduits may be made of any suitable material, and they may be built in the body or face of the walls themselves or be formed in the various moldings planted thereon—such as cornices, architraves, chair-strips, baseboards, &c. The main conduits, extending up and down or from floor to floor, may be located along elevator-shafts or stairways, or any other convenient place, and the chief branch conduits extending to the different rooms on each floor may be most conveniently located along the hallways.

In the accompanying drawings, which form a part of this specification, and in which similar letters of reference indicate like parts, I have shown, as illustrative of my invention, a part of an ordinary office-building provided with grooved recesses or conduits adapted for the reception of electric conductors or wires.

Figure 9:
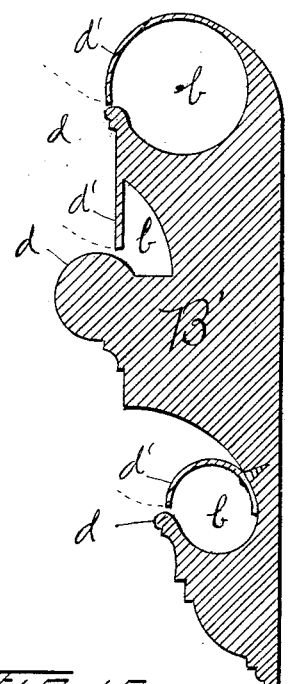
Figure 10:
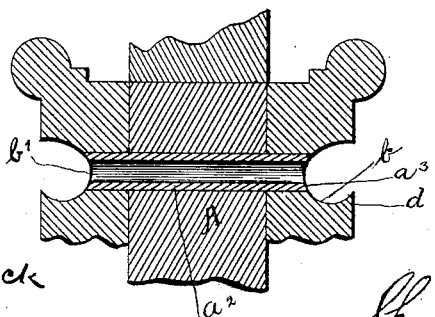

In said drawings, Figure 1 is a vertical section; Fig. 2, a horizontal section on line *x y* of Fig. 1. Figs. 3, 4, 5, 6, and 7 are perspective views of several different forms of grooved moldings adapted for use in my invention; and Figs. 8 and 9 are sectional views of moldings provided with hinged and flexible flaps or extensions for closing the lateral opening in the grooved recesses, and Fig. 10 is a section through the aperture in a wall.

The drawings are not in proportion, the moldings being enlarged for the purpose of showing the same more clearly.

In the drawings, A represents the walls of a building or a portion of the same; B, an elevator-shaft; C, different floors; D, hallways, and E different rooms or apartments.

$a$ is a grooved recess or conduit extending up and down from floor to floor. As shown in the drawings, it is located in the elevator-shaft, and is formed in the body of the wall, as this is the preferable location in buildings having an elevator; but it may be located elsewhere—for example, along a stairway, in the cornice or other molding thereof—in which case of course, instead of running in a vertical direction it would ordinarily follow the winding course of the stairway.

$b\ b$ represent branch grooved recesses or conduits extending along the hallways, connected directly with the vertical conduit or conduits $a$, and preferably located and formed in the cornice-moldings. At angles or corners the grooved recesses or conduits are connected together by abutting directly upon each other, as shown at $b^2\ b^2$. Connections are made through walls or partitions by apertures $a'\ a'$ therein, leading from the grooved recesses or conduits on one side to those on the other. These apertures should be formed in the walls at the time they are erected by laying short tubes or pipes $a^2\ a^2$ therein; and their ends may project into the moldings on the walls, and thus at the same time afford a firm support for the moldings, as shown at $a^3\ a^3$. The apertures may of course, however, be bored through the walls after they are erected without much difficulty.

$c\ c$ represent branch grooved recesses or conduits in the different rooms of the building, connecting directly with the hall-conduits $b\ b$ through apertures $a'\ a'$ in the walls. These sub-branch conduits may be located in the cornice, base-board, chair-rail, architrave, or other moldings of the room, according to convenience, as it may be desired to lead the conductors to different parts of the room or to adjoining rooms. The grooved recesses or conduits $a\ b\ c$ have projecting lips or members $d$, which serve to conceal the conductors $e$ from view. Where the grooved recess is located above the eye, as in a cornice, the member $d$ of course projects upward, and where located below the eye, as in a base-board, the member $d$ projects downward, as shown in Figs. 5 and 6. Where the grooved recess extends vertically, as in an architrave or pilaster, a suitable form for the groove and the projecting member $d$ is shown in Fig. 7. The moldings B′ are provided with apertures $b'$, registering with the apertures $a'$ in the walls, so that the wires or conductors $e$ may pass from the grooves $a\ b\ c$ through the same.

The wires or conductors $e$ are indicated in Figs. 1 and 2 by the broken lines.

In laying the wires or conductors under my improved system they are simply placed laterally in the grooved recesses, the ends of the wires being inserted, where necessary, through the apertures piercing the walls.

In Fig. 8 I have shown the molding B′ provided with a hinged flap, $d'$, to close the lateral opening into the grooves $a$, $b$, or $c$, and in Fig. 9 this flap is shown as made of flexible material instead of hinged. This improved feature of a flap to close the lateral opening to the grooved recess or conduit is desirable in some cases.

Any desired number of grooved recesses, $a\ b\ c$, may be grouped together in the same molding, according to the number of conductors which are or may probably be required.

In Fig. 3, which represents a combined cornice and picture-molding, I have shown it provided with four grooved recesses. The upper one, for example, may contain thermostat-wires, the next telephone-wires, and the two lower ones electric-light wires.

Fig. 4 shows a picture-molding provided with two grooved recesses; Fig. 5, a chair-strip; Fig. 6, a base-board; and Fig. 7, an architrave.

F represents a stairway.

The conductors may be led into the building from above or below—that is to say, from the roof or basement—according to the location of the outside conductors.

I claim—

1. In a building, the walls thereof, provided with a connected and continuous system of grooved recesses or conduits having lateral openings extending up and down from floor to floor and branching at the floors to the different rooms or apartments, substantially as specified.

2. In a building, the walls thereof, provided with a connected and continuous system of grooved recesses or conduits extending up and down from floor to floor and branching at the floors to the different rooms or apartments, said grooved recesses or conduits being connected at angles between different walls by abutting directly upon each other and on opposite sides of the same wall by apertures piercing the wall, substantially as specified.

3. In a building, the walls thereof, provided with a connected and continuous system of grooved recesses or conduits having lateral openings and extending up and down from floor to floor and branching at the floors to the different rooms or apartments, in combination with conductors laid in said grooved recesses or conduits, substantially as specified.

4. In a building, the walls thereof, provided with a connected and continuous system of grooved recesses or conduits having lateral openings extending up and down from floor to floor and branching at the floors along the hallways to the different rooms or apartments, substantially as specified.

5. In a building, the walls thereof, provided with a connected and continuous system of grooved recesses or conduits having lateral openings extending up and down from floor to floor and branching at the floors to the different rooms or apartments, said horizontally-branching grooved recesses having a projecting lip or member to conceal the conductors laid therein from view, substantially as specified.

6. In a building, the combination of halls provided with moldings having grooved recesses therein, with rooms provided with moldings having corresponding grooved recesses therein, and apertures through the walls connecting said grooved recesses, substantially as specified.

7. A molding having a grooved recess for reception of a conductor and a flap closing the lateral opening to said grooved recess, substantially as specified.

8. A molding having a grooved recess for reception of a conductor and a hinged flap closing the lateral opening to said grooved recess, substantially as specified.

9. The combination, in a building, with an elevator-shaft wall provided with a grooved recess, $a$, of hall-walls provided with moldings having grooved recesses $b$, connected with the former, and room-walls provided with moldings having grooved recesses $c$, and apertures $a'$ $a'$, connecting the latter with said grooves $b$, substantially as specified.

CHARLES NORMAN FAY.

Witnesses:
H. M. MUNDAY,
EDWARD ADCOCK.